US010308475B2

(12) United States Patent
Shi

(10) Patent No.: US 10,308,475 B2
(45) Date of Patent: Jun. 4, 2019

(54) SWITCHING MECHANISM FOR TRACTION DEVICE

(71) Applicant: Fuyou Shi, Zhejiang (CN)

(72) Inventor: Fuyou Shi, Zhejiang (CN)

( * ) Notice: Subject to any disclaimer, the term of this patent is extended or adjusted under 35 U.S.C. 154(b) by 204 days.

(21) Appl. No.: 15/641,333

(22) Filed: Jul. 5, 2017

(65) Prior Publication Data

US 2017/0297857 A1    Oct. 19, 2017

(30) Foreign Application Priority Data

Jun. 14, 2017    (CN) .................... 2017 2 0693031 U

(51) Int. Cl.
  *A01K 27/00*    (2006.01)
  *B65H 75/44*    (2006.01)

(52) U.S. Cl.
  CPC ....... B65H 75/4431 (2013.01); A01K 27/004 (2013.01); *B65H 2701/35* (2013.01)

(58) Field of Classification Search
  CPC ............... B65H 75/30; B65H 75/4431; B65H 2701/35; A01K 27/004
  See application file for complete search history.

(56) References Cited

U.S. PATENT DOCUMENTS

| | | | | |
|---|---|---|---|---|
| 4,856,726 A * | 8/1989 | Kang | .................. | A01K 27/004 242/384.7 |
| 5,483,926 A * | 1/1996 | Bogdahn | .............. | A01K 27/004 119/796 |
| 6,148,773 A * | 11/2000 | Bogdahn | .............. | A01K 27/004 119/794 |
| 6,526,918 B1 * | 3/2003 | Arnold | .................. | A01K 27/004 119/796 |
| 7,036,459 B1 * | 5/2006 | Mugford | .............. | A01K 27/004 119/796 |
| 7,168,393 B2 * | 1/2007 | Bogdahn | .............. | A01K 27/004 119/796 |
| 7,784,728 B2 * | 8/2010 | Shi | ........................ | A01K 27/004 119/796 |
| 8,651,411 B2 * | 2/2014 | Wang | .................... | A01K 27/004 119/796 |
| 9,104,226 B2 * | 8/2015 | Shi | ........................ | A01K 27/004 |
| 9,131,663 B2 * | 9/2015 | Vaccari | ................ | A01K 27/004 |
| 9,326,490 B2 * | 5/2016 | Shi | ........................ | A01K 27/004 |
| 9,468,196 B2 * | 10/2016 | Chen | .................... | A01K 27/004 |
| 2008/0230015 A1 * | 9/2008 | Bleshoy | ............... | A01K 27/004 119/796 |

(Continued)

FOREIGN PATENT DOCUMENTS

WO    WO-2009108925 A2 *    9/2009    .......... A01K 27/004

*Primary Examiner* — William A. Rivera

(57) ABSTRACT

A switching mechanism for traction device is provided, including: a push-pull button 1, a push-pull button decoration ring 2, a switching button 3, a reset spring 4, a right shell 5, a reel 6 and a left shell 7; wherein the push-pull button decoration ring 2 is sleeved on the push-pull button 1, in such a manner that the push-pull button 1 is fitted with a cambered surface of the left shell 7 and a cambered surface of the right shell 5; the switching button 3 is sleeved in the push-pull button 1; the push-pull button 1, the push-pull button decoration ring 2 and the switching button 3 form an integrated unit and are provided on the right shell 5 and the left shell 7. Sealing treatment is performed, in such a manner that deep hole directly entering internal part of the products is prevented.

5 Claims, 5 Drawing Sheets

(56) References Cited

U.S. PATENT DOCUMENTS

| | | | |
|---|---|---|---|
| 2012/0234959 A1* | 9/2012 | Christianson | B65H 75/4431 242/396.1 |
| 2013/0200197 A1* | 8/2013 | Bogdahn | A01K 27/004 242/396 |
| 2014/0238314 A1* | 8/2014 | O'Brien | A01K 27/004 119/796 |
| 2018/0125036 A1* | 5/2018 | Pang | A01K 27/004 |

* cited by examiner

SWITCHING MECHANISM FOR TRACTION DEVICE

CROSS REFERENCE OF RELATED APPLICATION

The present application claims priority under 35 U.S.C. 119(a-d) to CN 201720693031.9, filed Jun. 14, 2017.

BACKGROUND OF THE PRESENT INVENTION

Field of Invention

The present invention relates to a switching device, and more particularly to a switching mechanism for traction device.

Description of Related Arts

At present, traction devices are widely applied by pet keeping people, and different traction devices are required in different occasions, so as to meet the increasing market demands. The reel brake switch in the traction device is an important element of the traction device and directly influences the utilization performance of the traction device. There are some drawbacks in the conventional reel brake switch of the traction device, and the technical performances thereof are not capable of meeting the demands of the majority of users.

A Chinese patent with an application number of ZL 201420369616.1 (with a publication number of CN201420369616 U) discloses a switching mechanism for a traction device, comprising: a manual button, an upper shell, a reel, a lower shell and a reset spring; wherein a first slot is provided on the lower shell, a push-pull button is embedded in the first slot and is capable of sliding back and forth in the first slot; the manual button is sleeved in a corresponding hole of the push-pull button and provided on a corresponding position of the upper shell and the lower shell; the reel is provided on a central shaft of the lower shell and the reset spring is provided in the manual button. The utility of the ZL 201420369616.1 is manually pressed and flexible and easy to use, and is suitable for all domestic pets. A complete lock or open can be achieved by pressing the manual button while pulling the push-pull button back and forth.

However, the traction devices have some shortcomings in use as follows. The mating structure of the push-pull button and the shell is not sealed, which will cause a result that a deep hole directly enters an internal part of the product due to the back and forth movement of the push-pull button during the utilization process. Firstly, the big hole emerges next to the push-pull button of the product which severely affects the aesthetic and perfect degree of the product. Secondly, the big hole directly entered the internal part of the product seriously causes a result that objects with different particles directly enter the heart of the internal part of the product, which is easy to lead to product failure in general situations and stuck of the internal wheel of the traction device in serous situations, so that the products cannot be used in continue, which seriously affects the service life of the traction device.

SUMMARY OF THE PRESENT INVENTION

Accordingly, in view of the problems mentioned above, an object of the present invention is to provide an improved switching mechanism for the traction device based on the Chinese utility CN201420369616 U. The present invention adopts a more beautiful shape design and a more rational structure design, so as to make the users more comfortable and the operation safer. A sealing treatment is performed on the mating structure of the push-pull button and the shell, in such a manner that the deep hole directly entering the internal part of the products are not capable of emerging due to the back and forth movement of the push-pull button.

The present invention provides a switching mechanism for a traction device, comprising: a push-pull button 1, a push-pull button decoration ring 2, a switching button 3, a reset spring 4, a right shell 5, a reel 6 and a left shell 7; wherein the push-pull button decoration ring 2 is sleeved on the push-pull button 1, in such a manner that the push-pull button 1 is fitted with a cambered surface of the left shell 7 and a cambered surface of the right shell 5; the switching button 3 is sleeved in the push-pull button 1; the push-pull button 1, the push-pull button decoration ring 2 and the switching button 3 form an integrated unit and are provided on the right shell 5 and the left shell 7; the reel 6 is provided on a central shaft of the right shell 5; the reset spring 4 is provided in the switching button 3; a guide rib 9 is provided on the push-pull button 1 for being received in a guide grove 10 of the left shell 7 and the right shell 5; wherein when the switching button 3 is pressed and the push-pull button 1 is pulled backward, a limit platform 14 provided on the push-pull button 1 blocks a lock hook on the switching button 3, so as achieve a complete locking.

Preferably, a damping sheet 13 is provided on the push-pull button 1.

Preferably, a damping groove 12 is provided on the right shell 5.

Preferably, a wire-out opening 8 is provided on the right shell 5 and the left shell 7.

Preferably, the switching mechanism for the traction device further comprising a switching limit post 11 provided on the switching button 3, so as to limit the switching button 3.

Beneficial effects of the present invention are as follows.

1. The big hole exposed next to the push-pull button of the conventional products is performed with sealing treatment, which further improves the aesthetic and perfect degree of the products.

2. The big hole entering in the internal part of the products is performed with sealing treatment, so as to prevent the product failure caused by objects with different particles directly entering the heart position inside the products.

3. The manual button adopted by the present invention is flexible and easy for using, and thus is suitable for all domestic pets. The complete locking is achieved by pressing the switching button while pulling the push-pull button, and otherwise, the unlocking function is completed by pushing the push-pull button.

The present invention adopts a more beautiful shape design and a more rational structure design, so as to make the users more comfortable and provide more convenience while operating. Sealing treatment is performed on the mating structure of the push-pull button and the shell, in such a manner that the deep hole directly entering the internal part of the products exposed due to the back and forth movement of the push-pull button is prevented. The present invention greatly improves the sealing effects of the product, effectively prevents the dusts and debris from entering the internal part of the products, and thus improves the service life of the product.

These and other objectives, features, and advantages of the present invention will become apparent from the following detailed description, the accompanying drawings, and the appended claims.

Figure 1:
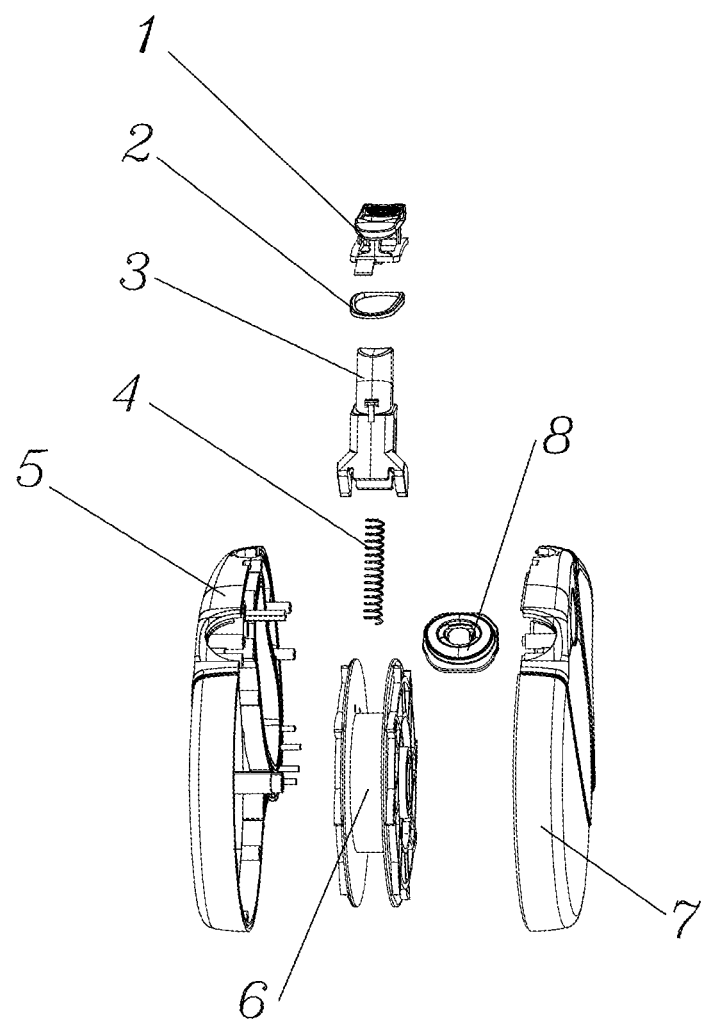
FIG. 1 is an exploded view of a switching mechanism for a traction device.
Figure 2:
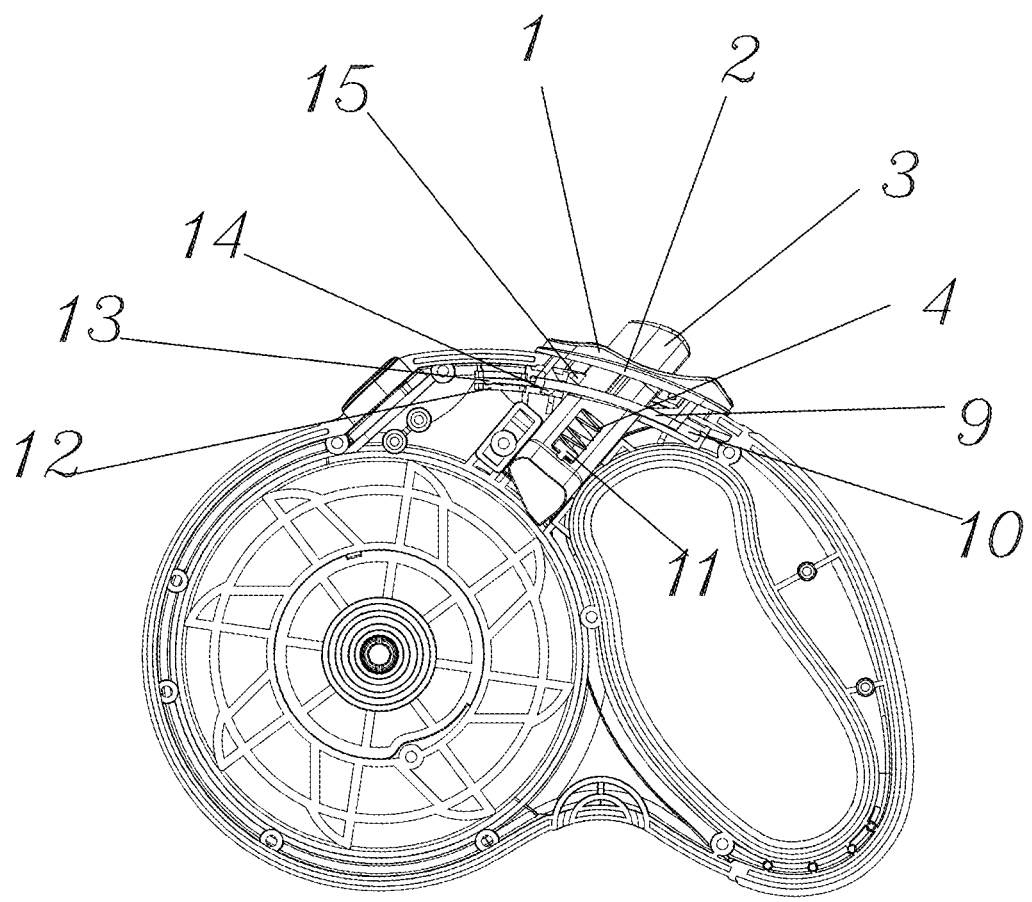
FIG. 2 is a front view of the switching mechanism for the traction device of the present invention.
Figure 3:
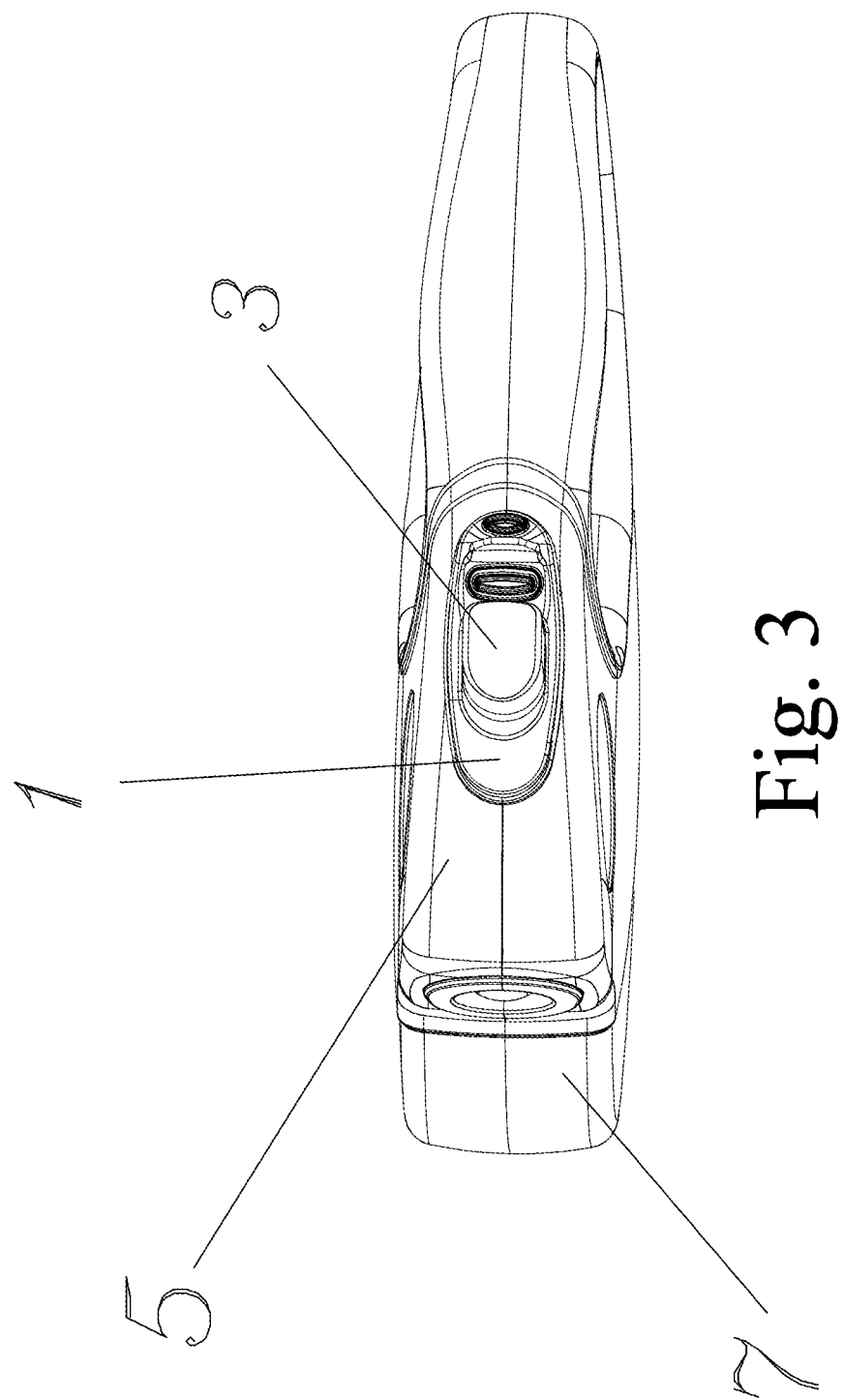
FIG. 3 is a side view of the switching mechanism for the traction device of the present invention.

Reference numbers in the FIGS.: 1—push-pull button; 2—push-pull button decoration ring; 3—switching button; 4—reset spring; 5—right shell; 6—reel; 7—left shell; 8—wire-out opening; 9—guide rib; 10—guide groove; 11—switching limit post; 12—damping groove; 13—damping sheet; 14—limit platform; 15—manual button hook.

DETAILED DESCRIPTION OF THE PREFERRED EMBODIMENT

Referring to FIGS. 1-5, the present invention provides a switching mechanism for a traction device, comprising: a push-pull button 1, a push-pull button decoration ring 2, a switching button 3, a reset spring 4, a right shell 5, a reel 6 and a left shell 7; wherein the push-pull button decoration ring 2 is sleeved on the push-pull button 1, in such a manner that the push-pull button 1 is fitted with a cambered surface of the left shell 7 and a cambered surface of the right shell 5; the switching button 3 is sleeved in the push-pull button 1; the push-pull button 1, the push-pull button decoration ring 2 and the switching button 3 form an integrated unit and are provided on the right shell 5 and the left shell 7; the reel 6 is provided on a central shaft of the right shell 5; the reset spring 4 is provided in the switching button 3; a guide rib 9 is provided on the push-pull button 1 for being received in a guide grove 10 of the left shell 7 and the right shell 5; wherein when the switching button 3 is pressed and the push-pull button 1 is pulled backward, a limit platform 14 provided on the push-pull button 1 blocks a lock hook on the switching button 3, so as achieve a complete locking.

Preferably, a damping sheet 13 is provided on the push-pull button 1.

Preferably, a damping groove 12 is provided on the right shell 5.

Preferably, a wire-out opening 8 is provided on the right shell 5 and the left shell 7.

Preferably, the switching mechanism for the traction device further comprising a switching limit post 11 provided on the switching button 3, so as to limit the switching button 3.

Figure 4:
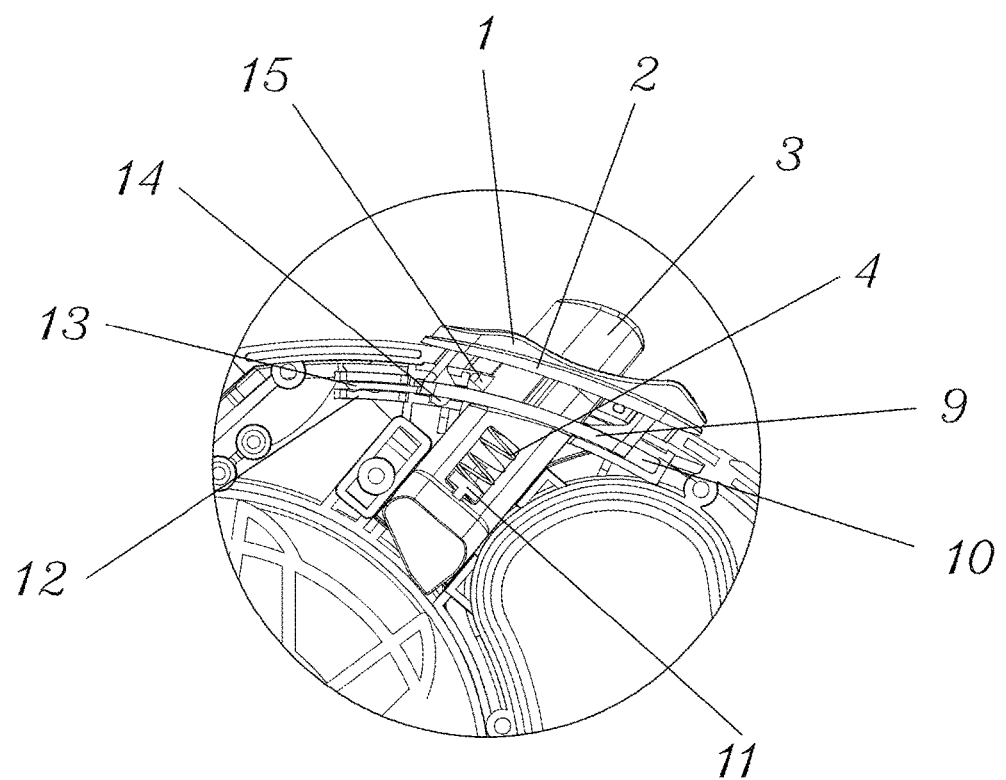
FIG. 4 is a sketch view of the switching mechanism for the traction device of the present invention in an unlocking state.

FIG. 4 is a sketch view of the switching mechanism for the traction device of the present invention in an unlocking state; wherein only by pressing the switching button while pushing the push-pull button, a complete unlocking process is achieved, which is simple fast and convenient.

Figure 5:
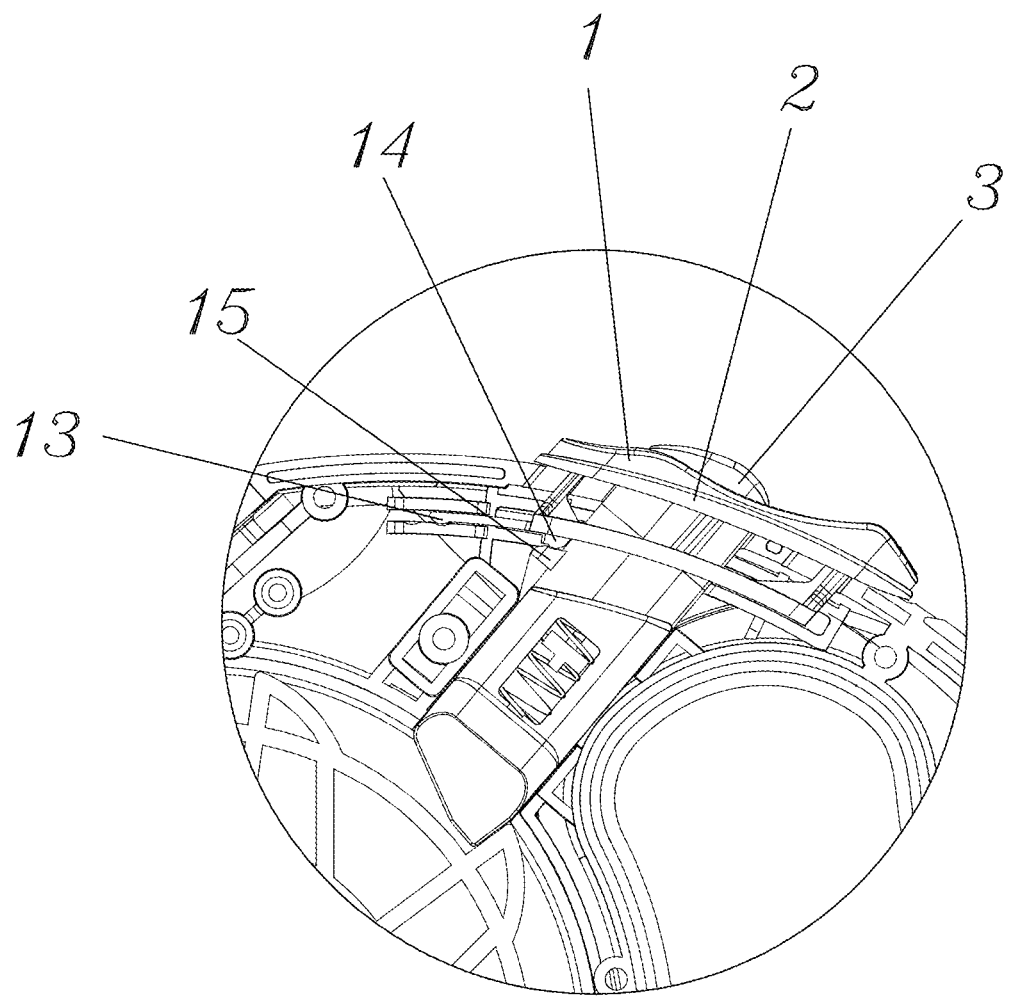
FIG. 5 is a sketch view of the switching mechanism for the traction device of the present invention in an unlocking state.

FIG. 5 is a sketch view of the switching mechanism for the traction device of the present invention in an unlocking state, wherein only by pressing the switching button while pulling the push-pull button, a complete locking process is achieved, which is simple fast and convenient.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A switching mechanism for a traction device, comprising: a push-pull button (1), a push-pull button decoration ring (2), a switching button (3), a reset spring (4), a right shell (5), a reel (6) and a left shell (7); wherein the push-pull button decoration ring (2) is sleeved on the push-pull button (1), in such a manner that the push-pull button (1) is fitted with a cambered surface of the left shell (7) and a cambered surface of the right shell (5); the switching button (3) is sleeved in the push-pull button (1); the push-pull button (1), the push-pull button decoration ring (2) and the switching button (3) form an integrated unit and are provided on the right shell (5) and the left shell (7); the reel (6) is provided on a central shaft of the right shell (5); the reset spring (4) is provided in the switching button (3); a guide rib (9) is provided on the push-pull button (1) for being received in a guide grove (10) of the left shell (7) and the right shell (5); wherein when the switching button (3) is pressed and the push-pull button (1) is pulled backward, a limit platform (14) provided on the push-pull button (1) blocks a lock hook on the switching button (3), so as achieve a complete locking.

2. The switching mechanism for the traction device, as recited in claim 1, wherein a damping sheet (13) is provided on the push-pull button (1).

3. The switching mechanism for the traction device, as recited in claim 1, wherein a damping groove (12) is provided on the right shell (5).

4. The switching mechanism for the traction device, as recited in claim 1, wherein a wire-out opening (8) is provided on the right shell (5) and the left shell (7).

5. The switching mechanism for the traction device, as recited in claim 1, further comprising a switching limit post (11) provided on the switching button (3), so as to limit the switching button (3).

* * * * *